United States Patent [19]

Bromba et al.

[11] Patent Number: 6,122,377
[45] Date of Patent: Sep. 19, 2000

[54] VIDEO SIGNAL RECEIVER WITH RECORD PROTECTION

[75] Inventors: Manfred Bromba, München, Germany; Karsten Rönner, Tokyo, Japan

[73] Assignee: Siemens Aktiengesellschaft, Munich, Germany

[21] Appl. No.: 09/005,697

[22] Filed: Jan. 12, 1998

Related U.S. Application Data

[63] Continuation of application No. PCT/DE96/00639, Apr. 11, 1996.

[30] Foreign Application Priority Data

Jul. 12, 1995 [DE] Germany .................. 195 25 425

[51] Int. Cl.⁷ .................. H04N 5/913; H04N 9/80
[52] U.S. Cl. .................. 380/203; 380/242; 348/453; 386/35; 386/94
[58] Field of Search .................. 380/5, 10, 203, 380/201, 212, 242; 348/453, 458; 386/31, 32, 34, 35, 36, 94; 705/57

[56] References Cited

U.S. PATENT DOCUMENTS

| | | | |
|---|---|---|---|
| 4,725,894 | 2/1988 | Sasaki et al. | 348/34 |
| 4,907,093 | 3/1990 | Ryan | 380/5 |
| 4,930,160 | 5/1990 | Vogel. | |
| 4,945,563 | 7/1990 | Horton et al. | 380/5 |
| 5,216,496 | 6/1993 | Miyamoto et al. | 348/34 |
| 5,258,826 | 11/1993 | Wakeland et al. | 348/34 |
| 5,657,387 | 8/1997 | Mogi et al. | 380/21 |

FOREIGN PATENT DOCUMENTS

| | | |
|---|---|---|
| 0267039A2 | 5/1988 | European Pat. Off. . |
| 0348218A2 | 12/1989 | European Pat. Off. . |

OTHER PUBLICATIONS

ISO/IEC 13818–1, dated Nov. 13, 1994.
Otto Limann et al.:"Fernsehtechnik ohne Ballast", Franzis–Verlag, München, 1988, pp. 581–584.

*Primary Examiner*—Gilberto Barron, Jr.
*Attorney, Agent, or Firm*—Herbert L. Lerner; Laurence A. Greenberg; Werner H. Stemer

[57] ABSTRACT

A video signal receiver has a first output terminal, at which only a chroma, video, blanking, sync signal or a video, blanking, syncs signal with a chrominance signal is output. A second output terminal carries the RGB color signals and the associated sync signals. Video recorders normally evaluate only a video, blanking, sync signal with the corresponding chrominance information and can be connected to the first output terminal. Television displays normally evaluate RGB signals as well and can be connected to the second output terminal. The signal output at the first output terminal for the video recorder can be selectively blocked by a control device which is controlled by an identifier produced at the transmitter end. As a result, it is possible to display an encrypted transmission on the television set, but not to record the transmission on the video recorder.

14 Claims, 1 Drawing Sheet

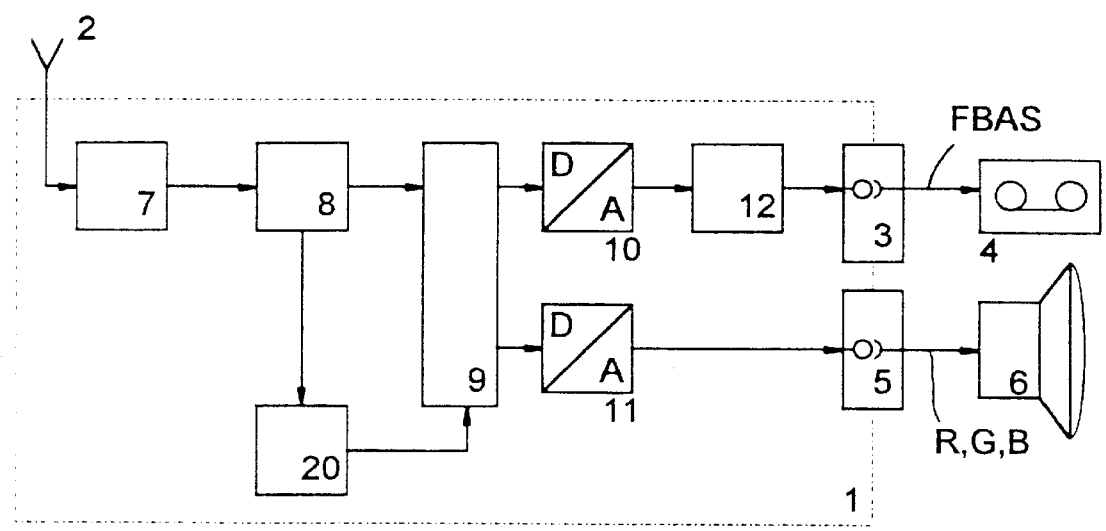
FIG.

VIDEO SIGNAL RECEIVER WITH RECORD PROTECTION

CROSS-REFERENCE TO RELATED APPLICATION

This is a continuation of international application Serial No. PCT/DE96/00639, filed Apr. 11, 1996.

BACKGROUND OF THE INVENTION

1. Field of the Invention

The invention relates to a video signal receiver to which a video signal recording device can be connected.

When receiving video signals, both in the case of cable-conducted transmission and in the case of radio transmission, reception authorization is necessary nowadays for some transmissions. For example, the broadcaster can transmit encrypted transmissions, and only those receiving subscribers who have corresponding decryption means, which can be acquired by licensing, can receive such transmissions. These services are nowadays referred to as Pay TV or Video On Demand. U.S. Pat. No. 4,930,160 describes a video signal receiver in which the display of a video transmission can be blocked by a control device. For this purpose, a transmitted code produced at the transmitter end is evaluated in the control device. Basically, the manufacturers of receiving devices are endeavouring, in the interest of broadcasters, to make it difficult or even impossible to record transmissions subject to access protection.

To date, this has been achieved by influencing the sync signal component of the video signal in the receiving device in such a way that display on a cathode ray tube device is readily possible, but recording with a video recorder produces extremely poor quality, or is even impossible. In the case of a known solution, in a color coder which converts digitally transmitted and received video signals into analog signals for driving conventional television sets and video recorders, the sync signal component is provided with deliberately introduced phase jitter. The synchronization devices of the television set, which normally have a relatively small time constant, can follow this phase jitter and produce a high-quality picture. Recording devices, on the other hand, in particular video recorders, cannot follow the phase jitter of the sync signal component on account of the inertial mass of the rotating video drum. Consequently, such transmissions can only be displayed on a cathode ray tube device; they cannot, however, be recorded. The receiving device terminals to which recording devices and cathode ray tube devices can be connected are not differentiated. However, the deliberate insertion of interference in the sync signal component can lead to signal processing problems in some television sets.

In addition, circuits for time-base correction already exist, and they can be used to correct the video signals which have been subjected to interference, with the result that the the video signals are suitable for recording all the same.

A device has become known heretofore from European patent publication EP-A-0 267 039 wherein it is possible to receive a video signal with an identifier that indicates whether or not recording of the video signal is allowed. If recording is not allowed, then the video signal is influenced by the recording device in such a way that recording thereof at a reasonably acceptable quality is no longer possible.

European publication EP-A-0 348 218 describes a double-deck video recorder. Any recording operation is blocked if the video signal to be recorded contains a copy-protect signal.

SUMMARY OF THE INVENTION

It is accordingly an object of the invention to provide a video signal receiver with record protection, which overcomes the above-mentioned disadvantages of the prior art devices and methods of this general type and which is essentially a different approach and solution in preventing the recording of transmissions with access protection. It is an important object that the novel solution should be realized as simply as possible and applied to existing recorders and monitors without further disadvantages.

With the foregoing and other objects in view there is provided, in accordance with the invention, a video signal receiver, comprising:

an input terminal receiving a video input signal with a blocking identifier;

a first output terminal for connecting a video recorder, the first output terminal carrying a video information signal with video, blanking, sync, and chrominance information;

a second output terminal for connecting a screen display device, the second output terminal carrying a video information signal with individual color signals and sync and field signals; and a control device connected between the input terminal and the first output terminal, the control device selectively blocking the video information signal at the first output terminal in response to receiving the blocking identifier in the video input signal.

In accordance with an added feature of the invention, the control device is adapted to recognize data encrypted by a transmitter of the video input signal and, in response to recognizing the data, blocking the video information signal at the first output terminal.

In accordance with an additional feature of the invention, the control device is adapted to receive a control command in the video input signal originating from a transmitter of the video input signal and, in response to recognizing the control command, blocking the video information signal at the first output terminal.

In accordance with another feature of the invention, the video input signal is a digital data stream including the control command, and wherein the control device is adapted to recognize and decode the control command in the digital data stream.

In accordance with a further feature of the invention, the video input signal is an analog signal with a field blanking interval, wherein the control command is transmitted as a digital data segment in the field blanking interval of the video input signal, and wherein the control device is adapted to separate the digital data and identify and decode the control command.

In accordance with again an added feature of the invention, the first output terminal carries a video output signal selected from the group consisting of a video signal with a single chroma, video, blanking, sync signal and a video signal with a video, blanking, sync signal with a further chrominance signal.

It is a further object of the invention to specify a solution for circumventing the record protection achieved by a video signal receiver according to the above-summarized invention.

With this and other objects in view there is provided, in accordance with the invention, a device as described above which further comprises a video signal converter connected to the second terminal, the converter being adapted to convert the video information signal with the individual color signals and sync and field signals into a video output signal with video, blanking, sync, and chrominance information, and including a terminal outputting a converted signal from the converter for connecting a video recording.

With the above and other objects in view, there is also provided a method of selectively blocking the recording of a video signal. The method comprises the following steps:

transmitting a video information signal with a blocking identifier to an input terminal of a video receiver;

outputting the video information at a first output terminal at which a video recorder is connected in the form of a video information signal with video, blanking, sync, and chrominance information; outputting the video information at a second output terminal at which a screen display device is connected in the form of a video information signal with individual color signals and sync and field signals; and selectively blocking an output at the first output terminal in response to receiving the blocking identifier in the video input signal.

In accordance with a concomitant feature of the invention, the video signal at the second terminal is converted from the video signal with the individual color signals and sync and field signals into a video output signal with video, blanking, sync, and chrominance information, and feeding the converted signal to a video recorder for bypassing a blocking of the first output terminal.

The invention is based on the premise that video information can be fed to presently available, conventional recording devices, in particular video recorders, only by using a composite video signal. The composite video signal is in most cases the so-called chroma, video, blanking, sync signal (CVBS). The CVBS signal contains, in a single signal, line sync pulses, color burst, black-and-white picture information and color picture information as well as field sync pulses. Furthermore, recording devices are available which have an input for a composite video, blanking, syncs signal (VBS or Y) having the black-and-white picture information and the line and field pulses as well as an input for a signal (C), containing the color information, including the color burst. This applies to virtually all currently available video recorders. The standardized SCART socket is used here as the means for connecting these recording devices to a receiving device. Television sets, on the other hand, can additionally be supplied, moreover, with the video information via the RGB (red-green-blue) color signals and the separate lines for sync and field pulses. The SCART socket is also used for this purpose. Video recorders driven by RGB signals are not produced or sold at the present time.

The invention provides a first connecting terminal for the connection of the video recorder and a further connecting terminal for the connection of the television set. The connecting terminals are SCART sockets, for example. If a transmission is received for which reception authorization is required, the connection for the video recorder is blocked. The transmission can only be viewed on the cathode ray tube device, it cannot, however, be recorded. Owing to the different connection interfaces for the television set and the video recorder in the receiving device, the video recorder cannot be operated on the socket provided for the television set. It is thus not readily possible to record a transmission provided with reception authorization using commercially available video recorders. The video recorder connection is not blocked during the reception of a transmission which is not provided with reception authorization, with the result that a transmission can be recorded. In parallel with this, the transmission can also be displayed on the cathode ray tube device, the user also being able to request further functions, for example teletext reception or operating menus displayed on the screen.

The video signal receiver of the invention may be constructed as a separate unit with externally accessible terminals for the video recorder and television set, for example in the form of SCART sockets, or it may be provided within the housing of a television set. In this case, expediently, only the terminal for the video recorder is accessible. Practical protection against undesired recording is achieved according to the invention with less outlay compared with the prior art. The reproduction quality at the television set is not reduced.

The information for blocking the connection for the recording device is transmitted at the transmitter end. For evaluation purposes, the receiving device is provided with control means, which identify the code, supplied at the transmitter end, for disconnecting the output for the recording device. When encrypted transmissions are transmitted, the control device identifies the reception of the encrypted transmission and blocks the output for the recording device. If the broadcaster desires that unencrypted transmissions should also not be recorded, it is sufficient to transmit a corresponding identification signal, which the control device identifies and converts into a disconnection of the output for the recording device.

If the video information is transmitted in a digital signal, a corresponding identifier in the form of software information can readily be transmitted together with the transmission. Even in the event of transmission in accordance with analog transmission standards, the control information can be transmitted as digital data in the field blanking interval, for example according to a European teletext standard or according to a video recorder programming system standard.

The video signal receiver is simple and can be realized with already existing circuit means without any significant additional outlay. The record protection can only be circumvented with an additional circuit measure. This circuit measure consists in an additional device which produces a composite video signal, either a CVBS signal or Y and C signals or both combined, from the RGB signals and line/field sync signals which can be picked off at the terminal for the television signal. However, such an additional device is not available at the present time.

Accordingly, the video signal receiver according to the invention affords good record protection with very low outlay according to the current level of technology.

Other features which are considered as characteristic for the invention are set forth in the appended claims.

Although the invention is illustrated and described herein as embodied in a video signal receiver with record protection, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The drawing FIGURE is a diagrammatic view illustrating the novel system according to the invention.

DESCRIPTION OF THE PREFERRED EMBODIMENT

Referring now to the FIGURE of the drawing in detail, there is seen a video signal receiver 1 which receives digital video signals at an input 2, shown as an antenna 2 feed. The digital video signals are coded according to a digital standard for coding moving pictures, for example MPEG2. The input may also receive its signal from a cable network as an alternative. An output terminal 3 is provided at the output end, to which a video recorder 4 is connected. An output terminal 5 is provided for connection of a screen display device 6, such as a television set 6 or a television monitor 6. The signal received at the input 2 is demodulated in a device 7 and converted into a digital data stream. The digital data stream is subsequently fed to a device 8, which serves for decrypting data which have been encrypted for the purpose of access control. The device 8 is insertible into (and removable from) the device and it may be made available by the owner of the signal (e.g. the operator of the station from which the signal is received) against payment of a license fee. The device 8 contains the key for decrypting the data which have been transmitted in encrypted form. The decrypted data stream output by the device 8 is fed to a device 9, which carries out the decoding according to the transmission standard. The device 9 is an MPEG2 decoder in the example described. The decoder 9 produces output signals for the branch to the terminal for the video recorder and the branch to the terminal for the television set. Digital to analog conversion is carried out in each path by a corresponding D/A converter 10 and 11, respectively. In the television set branch, the RGB signals and vertical and horizontal sync (line and field sync signals) output by the D/A converter 11 are passed directly to the output terminal 5. Depending on the functions desired at the output, further information, for example adjustment menus, text displays, teletext pages, internet feeds, and the like, can also be inserted into these RGB signals. In the video recorder branch, the digital/analog converter 10 likewise produces RGB signals and the corresponding sync pulses, which are fed to a device 12. In the device 12, these signals are converted into a single chroma, video, blanking, sync signal CVBS. The conversion is carried out according to the NTSC, PAL, and/or SECAM standard. The CVBS signal is available at the terminal 3. Furthermore, VBS and C signals can be produced in addition or as an alternative (not illustrated).

The terminals 3 and 5 are preferably standardized SCART sockets. In the terminal 5, only the connecting lines for the RGB signals and the line and field symbols are wired up, and if appropriate reference potential connecting lines as well. In the terminal 3, the lines for the CVBS signal and/or the lines for the VBS signal and the C signal are wired up.

A conventional video recorder 4 is connected to the terminal 3. The video recorder 4 receives the video information with only a chroma, video, blanking, syncs signal. The conventional home-style video recorder 4 cannot evaluate any RGB signals. A conventional television receiver or monitor 6 is connected to the terminal 5. The television 6 is adapted to convert at least RGB signals and the corresponding sync signals into a picture, which is displayed on the screen.

The video recorder branch can be disconnected by the control device 20, under the control of the signal originator (the station from which the signal originates). The received transmission signal, therefore, cannot be recorded on the video recorder 4, but can be viewed on the television 6. The device 20 identifies that an encrypted transmission is being received. This is communicated to the control device 20 by the decryption device 8. In response, the device 20 disconnects the video recorder branch, for example by blocking the corresponding output of the MPEG2 decoder.

It is also possible for corresponding software information to be inserted into the transmitted video data stream at the transmitter end which is evaluated in the device 20 for the purpose of disconnecting that output of the decoder 9 which supplies the video recorder. As a result, it is possible to avoid the recording even of unencrypted transmissions, under the control of the transmitter end. For this purpose, the control device 20 contains means which identify a control command contained in the video data stream, so that in response the video recorder branch is disconnected.

Since it is not possible to feed an RGB signal into current commercially available video recorders 4, it is not possible to record an encrypted transmission by connecting the video recorder 4 to the terminal 5 for the television set.

It is, however, possible to circumvent the record protection described by designing an additional device which can be connected to the terminal 5 and converts the RGB signals and sync signals provided there into a chroma, video, blanking, sync signal or VBS and C signals. The video recorder can then evaluate and record the signals present at the non-blocked terminal 5. In a most practical system, the additional device essentially contains a NTSC/PAL/SECAM coder 12.

We claim:

1. A video signal receiver, comprising:

an input terminal receiving a video input signal with a blocking identifier;

a first output terminal for connecting a video recorder, said first output terminal carrying a video information signal with video, blanking, sync, and chrominance information;

a second output terminal for connecting a screen display device, said second output terminal carrying a video information signal with individual color signals and sync and field signals; and a control device connected between said input terminal and said first output terminal, said control device selectively blocking the video information signal at said first output terminal in response to receiving the blocking identifier in the video input signal.

2. The device according to claim 1, wherein said control device is adapted to recognize data encrypted by a transmitter of the video input signal and, in response to recognizing the data, blocking the video information signal at said first output terminal.

3. The device according to claim 1, wherein said control device is adapted to receive a control command in the video input signal originating from a transmitter of the video input signal and, in response to recognizing the control command, blocking the video information signal at said first output terminal.

4. The device according to claim 3, wherein the video input signal is a digital data stream including the control command, and wherein the control device is adapted to recognize and decode the control command in the digital data stream.

5. The device according to claim 3, wherein the video input signal is an analog signal with a field blanking interval, wherein the control command is transmitted as a digital data segment in the field blanking interval of the video input signal, and wherein said control device is adapted to separate the digital data and identify and decode the control command.

6. The device according to claim 1, wherein the first output terminal carries a video output signal selected from the group consisting of a video signal with a single chroma, video, blanking, sync signal and a video signal with a video, blanking, sync signal with a further chrominance signal.

7. The device according to claim 1, which further comprises a video signal converter connected to said second terminal, said converter being adapted to convert the video information signal with the individual color signals and sync and field signals into a video output signal with video, blanking, sync, and chrominance information, and including a terminal outputting a converted signal from said converter for connecting a video recording.

8. A method of selectively blocking the recording of a video signal, comprising:

transmitting a video information signal with a blocking identifier to an input terminal of a video receiver;

outputting the video information at a first output terminal at which a video recorder is connected in the form of a video information signal with video, blanking, sync, and chrominance information;

outputting the video information at a second output terminal at which a screen display device is connected in the form of a video information signal with individual color signals and sync and field signals; and selectively blocking an output at the first output terminal in response to receiving the blocking identifier in the video input signal.

9. The method according to claim 8, wherein the blocking step comprises blocking the first output terminal with a control device adapted to recognize data encrypted by a transmitter of the video information signal.

10. The method according to claim 8, which comprises transmitting a control command in the video information signal and, in response to recognizing the control command, blocking the video information signal at the first output terminal.

11. The method according to claim 10, which comprises transmitting the video information signal in the form of a digital data stream including the control command, and recognizing and decoding the control command in the digital data stream with a control device.

12. The method according to claim 10, wherein the transmitting step comprises transmitting an analog video signal with a field blanking interval, and transmitting the control command as a digital data segment in the field blanking interval of the video information signal.

13. The method according to claim 8, wherein the step of outputting at the first output terminal comprises outputting a video output signal selected from the group consisting of a video signal with a single chroma, video, blanking, sync signal and a video signal with a video, blanking, sync signal with a further chrominance signal.

14. The method according to claim 8, which further comprises converting the video signal at the second terminal from the video signal with the individual color signals and sync and field signals into a video output signal with video, blanking, sync, and chrominance information, and feeding the converted signal to a video recorder for bypassing a blocking of the first output terminal.

* * * * *